(12) United States Patent
Takaki et al.

(10) Patent No.: US 10,023,039 B2
(45) Date of Patent: Jul. 17, 2018

(54) WORK VEHICLE WITH A POWER-TRAVEL DRIVE UNIT

(71) Applicant: Kubota Corporation, Osaka-shi (JP)

(72) Inventors: Go Takaki, Sakai (JP); Yukifumi Yamanaka, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 15/374,118

(22) Filed: Dec. 9, 2016

(65) Prior Publication Data
US 2017/0246942 A1    Aug. 31, 2017

(30) Foreign Application Priority Data
Feb. 25, 2016   (JP) .................................. 2016-034383

(51) Int. Cl.
*B60K 1/04*     (2006.01)
*B60L 11/14*    (2006.01)
*B60L 11/18*    (2006.01)

(52) U.S. Cl.
CPC ................ *B60K 1/04* (2013.01); *B60L 11/14* (2013.01); *B60L 11/1877* (2013.01); *B60K 2001/0422* (2013.01)

(58) Field of Classification Search
CPC ..................................... B60K 1/00; B60K 1/04
See application file for complete search history.

(56) References Cited

U.S. PATENT DOCUMENTS 5,378,555 A * 1/1995 Waters ..................... B60K 1/04
                                                    180/68.5

FOREIGN PATENT DOCUMENTS

JP         2010250984 A    11/2010

\* cited by examiner

*Primary Examiner* — John D Walters
*Assistant Examiner* — James J Triggs
(74) *Attorney, Agent, or Firm* — The Webb Law Firm

(57) ABSTRACT

A work vehicle comprises: a vehicle frame; a driving portion in which a driver seat is provided; an electric motor for driving the vehicle to travel; and a battery for supplying electric power to the electric motor, the battery including a plurality of battery modules accommodated in a single battery pack. Each of the battery modules is formed as a rectangular box whose longitudinal length is different from its lateral length in a planar view, and the battery modules are arranged adjacent to each other with a short side of one of the battery modules opposing a long side of the other of the battery modules. The battery pack is also formed to conform to the contour of the aggregate of the battery modules.

4 Claims, 14 Drawing Sheets

WORK VEHICLE WITH A POWER-TRAVEL DRIVE UNIT

CROSS-REFERENCE TO RELATED APPLICATION

This application claims priority to Japanese Patent Application No. 2016-034383 filed Feb. 25, 2016, the disclosure of which is hereby incorporated in its entirety by reference.

BACKGROUND OF THE INVENTION

Field of the Invention

One example of a vehicle battery for a work vehicle having an electric motor for driving the vehicle to travel and a battery for supplying electric power to the electric motor is disclosed in JP 2010-250984A, in which a plurality of battery modules are secured systematically in rows in a battery pack having a shape of a rectangular box (see paragraphs [0007] and [0021] and FIGS. 1-13).

In the structure described above, where a plurality of battery modules are secured systematically in rows, the interior space of the battery are completely filled with the battery modules, allowing for a battery pack with a small surface area relative to its volume. This advantageously provides a useful battery pack in that the pack's onboard footprint is small and that it is easy to put together these packs compactly for shipping or transport.

However, the entire length of the battery pack, in which a plurality of battery modules are linearly arranged, is an integral multiple of the length of each battery module contained. Accordingly, even in the case of a battery pack with a relatively small volume, if the battery pack is used with a work vehicle with various pieces of onboard work equipment, the battery pack may need to be installed where it can avoid interference with the various work equipment, depending on the length of the battery pack. This tends to limit the location where the battery pack can be installed.

Moreover, this battery pack has further room for improvement as the heat generated in the battery modules can easily be trapped inside because the general shape of the battery pack is a rectangular box with a relatively small surface area.

An object of the present invention is to reduce the limitation on the location for the installation of the battery pack by forming the entire battery pack in a manner that conforms to the conditions of the location for its installation while enhancing the cooling efficiency of the battery pack.

SUMMARY OF THE INVENTION

A work vehicle according to the present invention comprises: a vehicle frame; a driving portion in which a driver seat is provided; an electric motor for driving the vehicle to travel; and a battery for supplying electric power to the electric motor, the battery including a plurality of battery modules accommodated in a single battery pack; wherein each of the battery modules is formed as a rectangular box whose longitudinal length is different from its lateral length in a planar view, and the battery modules are arranged adjacent to each other with a short side of one of the battery modules opposing a long side of another of the battery modules, and further wherein the battery pack is formed to conform to a contour of an aggregate of the battery modules that are accommodated.

According to the present invention, of the plurality of the battery modules disposed in the battery pack, the battery modules adjacent to each other are arranged such that a short side of one of the battery modules opposes a long side of the other of the battery modules. In this way, as the battery modules are arranged in the battery pack with a short side of a battery module opposing a long side of the other, the length of the battery pack is equal to the sum of the long side and the short side of the battery modules. This reduces the lateral length as compared to if short sides of the battery modules oppose each other, thus reducing the limitation on the location for the installation of the battery pack.

In addition, the battery modules are arranged with a short side of one of the battery modules opposing a long side of the other, and the battery pack is formed to conform to the contour of the aggregate consisting of the battery modules accommodated inside. Accordingly, the battery pack does not have a shape of a simple rectangular box but an irregular shape similar to a T or L-shape. This increases the surface area of the battery pack exposed to wind received as the vehicle body travels, thus advantageously facilitating the air-cooling efficiency.

In one advantageous aspect of the foregoing work vehicle, in the battery pack, the one battery module, which is a laterally long battery module whose long sides extend in a lateral direction, and the other battery module, which is a longitudinally long battery module whose long sides extend in a longitudinal direction, are accommodated such that a short side of the laterally long battery module opposes a long side of the longitudinally long battery module, and the battery pack is disposed between a left and right pair of main frames that constitutes the vehicle frame.

According to the present invention, as the battery modules are arranged in the battery pack with a short side of one of the battery modules opposing a long side of the other, the length of the battery pack is made shorter than if short sides of the battery modules oppose each other. This reduces the limitation on the location for the installation of the battery pack, facilitating the installation in a relatively narrow space between right and left main frames.

In another advantageous aspect, the driver seat is provided in an intermediate position in the traveling body in the longitudinal direction, and the battery pack is disposed in a space under the driver seat.

The present invention utilizes the lower space under the driver seat to be able to easily dispose the battery pack at the lowest possible position where it can avoid interference with other apparatuses.

In yet another advantageous aspect, in the battery pack, one of the battery modules and the other of the battery modules are arranged in a stepwise manner with one of the battery modules higher than the other.

According to the present invention, the space created by the height differences between the battery modules arranged in a stepwise manner with one module higher than the other is effectively utilized. The upper height difference provides a useful space for easily accommodating various control devices and wiring while the lower height difference provides a useful space for easily accommodating other objects or defining a cooling airflow path for the lower battery module.

In yet another advantageous aspect, the electric motor for driving the vehicle to travel is disposed below a portion of the battery pack where the higher one of the battery modules is disposed.

According to the present invention, the lower space under a portion where the higher battery module is disposed can be utilized to accommodate the electric motor. This facilitates making the motive power portion of the vehicle compact in size. Moreover, as the relatively heavy electric motor is positioned low under the higher battery module, the center of gravity of the overall vehicle body can also be advantageously lowered.

DETAILED DESCRIPTION OF THE PREFERRED EMBODIMENTS

An embodiment of a work vehicle provided with a power-travel drive unit according to the present invention will now be described with reference to the attached drawings.

Note that the forward and rear (i.e., longitudinal) directions and the left and right (i.e., lateral) directions are defined as follows throughout the description of the embodiment unless otherwise specified: The forward direction refers to the direction of forward travel of a traveling body, such as the utility vehicle to which the present invention is applied (the direction indicated by the arrow "F" in FIG. 2), the rear direction refers to the direction of reverse travel of the traveling body (the direction indicated by the arrow "B" in FIG. 2), the right direction refers to the direction to the right, facing in the forward direction (the direction indicated by the arrow "R" in FIG. 2), and the left direction refers to the direction to the left, facing in the forward direction (the direction indicated by the arrow "L" in FIG. 2).

Overall Configuration

Figure 1:
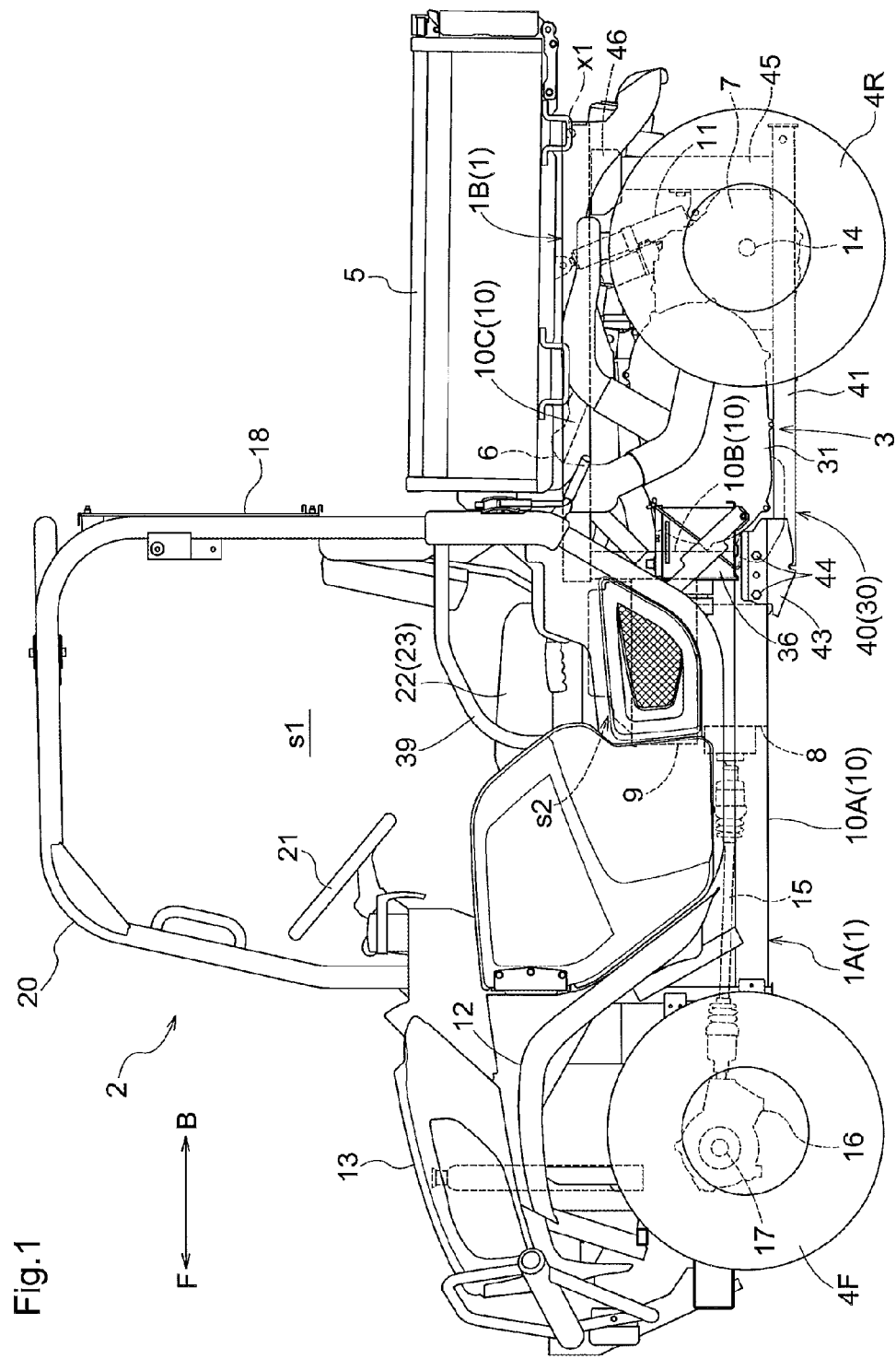
FIG. 1 is a left side view of a utility vehicle according to the present invention.
Figure 2:
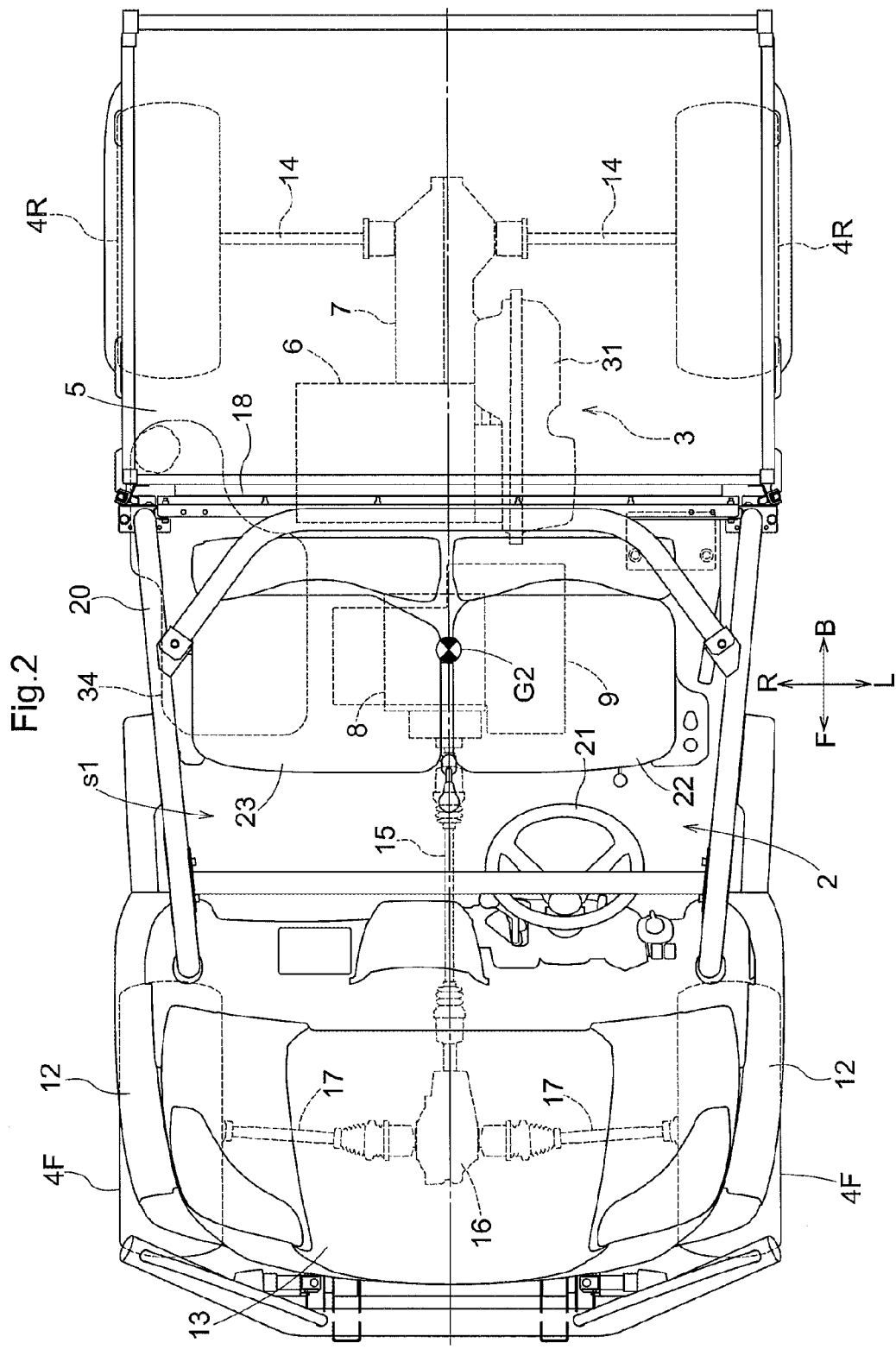
FIG. 2 is a plan view of the utility vehicle.
Figure 3:
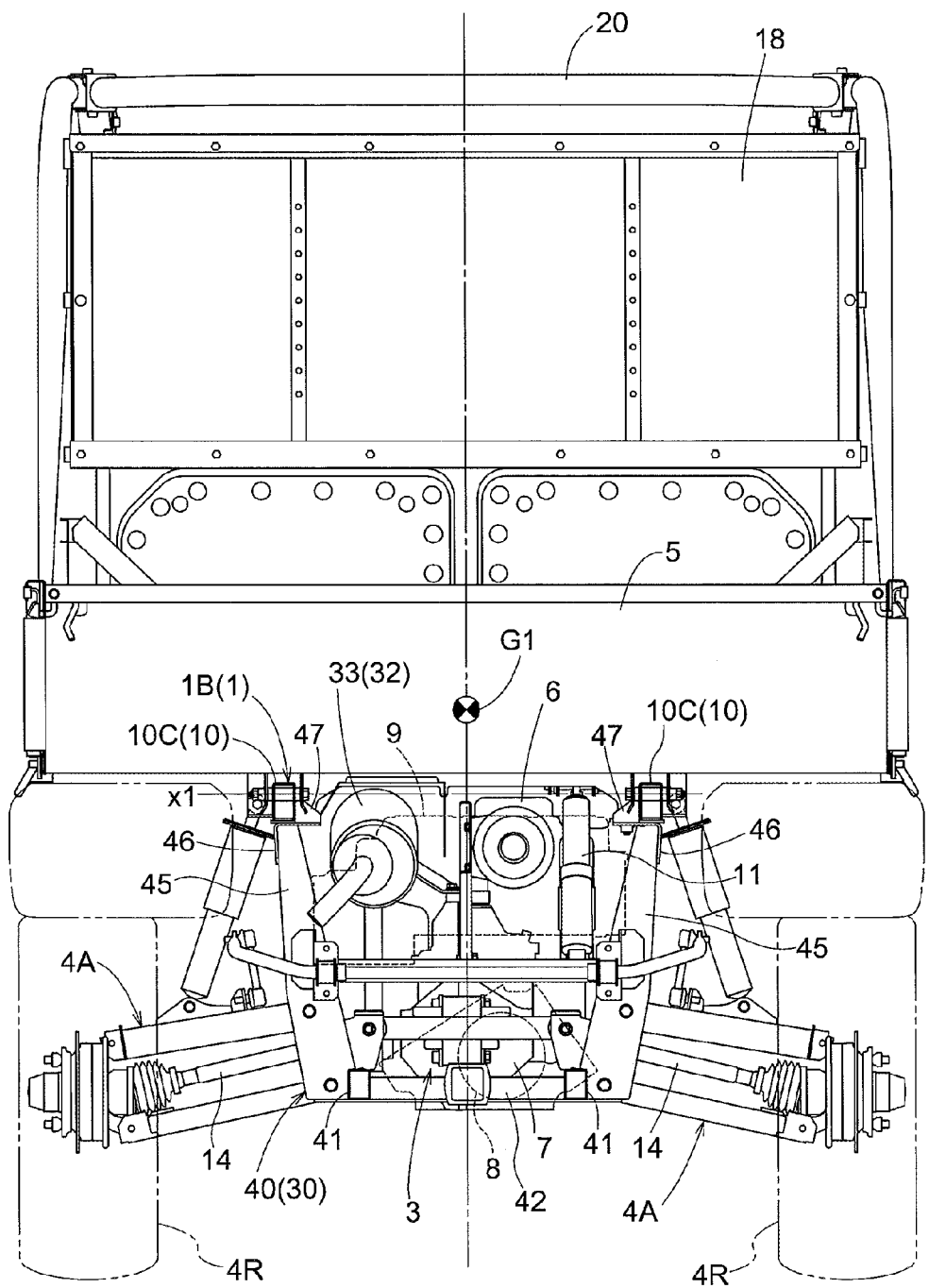
FIG. 3 is a rear view of the utility vehicle.

FIGS. 1-3 show a utility vehicle as an example of a work vehicle provided with a power-travel drive unit.

This utility vehicle has a pair of steerable right and left front wheels 4F supported at the front of a vehicle frame 1 that forms the skeletal structure of the traveling body. Supported at the rear of the vehicle frame 1 is a left and right pair of rear wheels 4R that cannot be steered. These front wheels 4F and rear wheels 4R are configured to receive the driving force transmitted from the travel output units to be described below. In this way, the utility vehicle is configured as a four wheeled vehicle capable of four-wheel drive.

Provided in the intermediate portion of the traveling body in the front and rear (longitudinal) directions is a driving portion 2 that includes a steering wheel 21 and a driver seat 22.

Provided rear of the driving portion 2 is a cargo bed 5 that is operated to perform dumping on a pivot x1 at its rear end, and a partition member 18 is provided between the driving portion 2 and the cargo bed 5 (to form the rear wall of the driving portion 2) for separating the driving portion 2 from the cargo bed 5.

The cargo bed 5 is configured to be operated to perform dumping by an electro-hydraulic cylinder 11 disposed on the vehicle frame 1 between the cargo bed 5 and a motive power portion support frame 30, which will be described below. The utility vehicle additionally includes right and left front fenders 12 and a hood 13 at the front thereof.

A motive power portion 3 is provided at the rear of the traveling body under the cargo bed 5.

Provided in the motive power portion 3 are two systems of travel output units, i.e., a gasoline engine 6 as an internal combustion engine (referred to simply as "engine" hereinafter) and an electric motor 8.

Of the two systems of travel output units, the driving force of the engine 6 is transmitted to the rear wheels 4R via rear axles 14 (serving as the power transmission shafts) extending laterally outward from a transmission case 7 that contains a transmission (not shown). The driving force of the electric motor 8 is inputted to a front wheel differential case 16 via a front wheel drive shaft 15 that extends forward from the front end of the electric motor 8 and transmitted to the front wheels 4F via right and left front axles 17.

This electric motor 8 and the battery 9 for supplying electric power to the electric motor 8 constitute the power-travel drive unit.

The aforementioned driving portion 2 has a ROPS frame 20 that surrounds the driver seat 22 in which the operator sits and a passenger seat 23 in which a passenger sits, thus defining an occupant space s1. In this way, the occupants sitting in the driver seat 22 and the passenger seat 23 are contained in the occupant space s1 surrounded by the ROPS frame 20.

Figure 4:
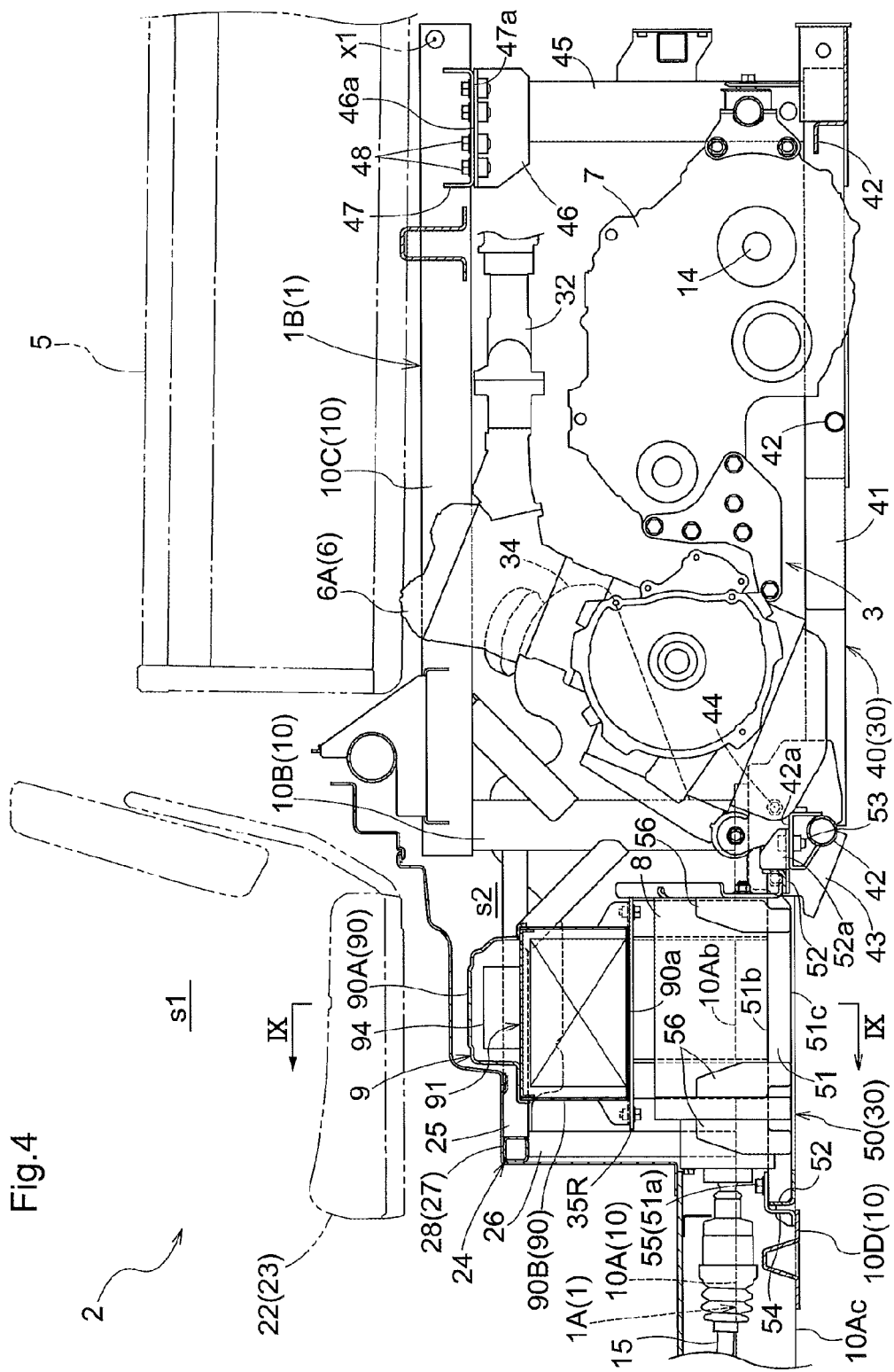
FIG. 4 is a left side view showing the vehicle frame and the motive power portion in the rear portion of the utility vehicle.
Figure 5:
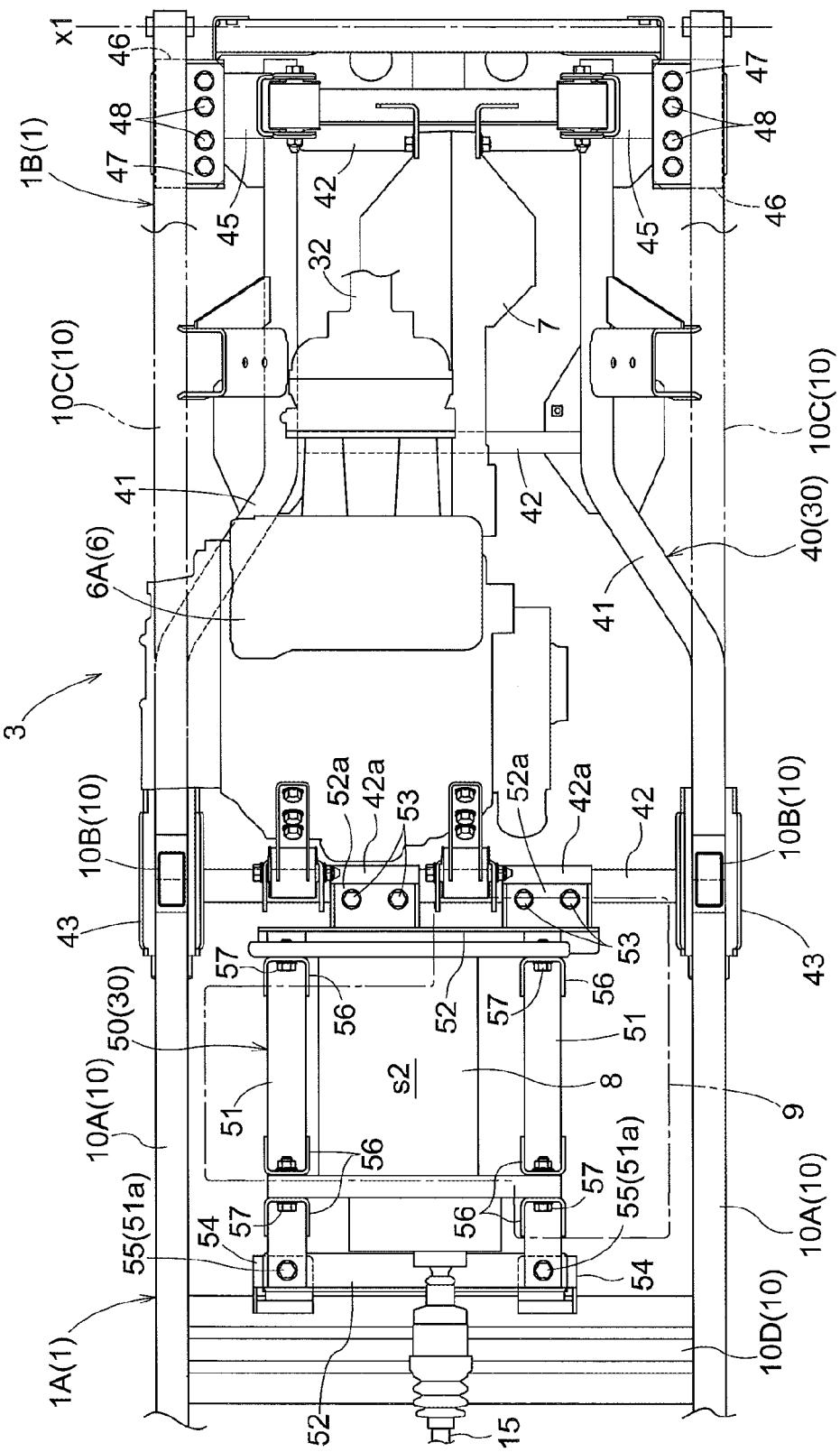
FIG. 5 is a plan view showing the vehicle frame and the motive power portion in the rear portion of the utility vehicle.
Figure 6:
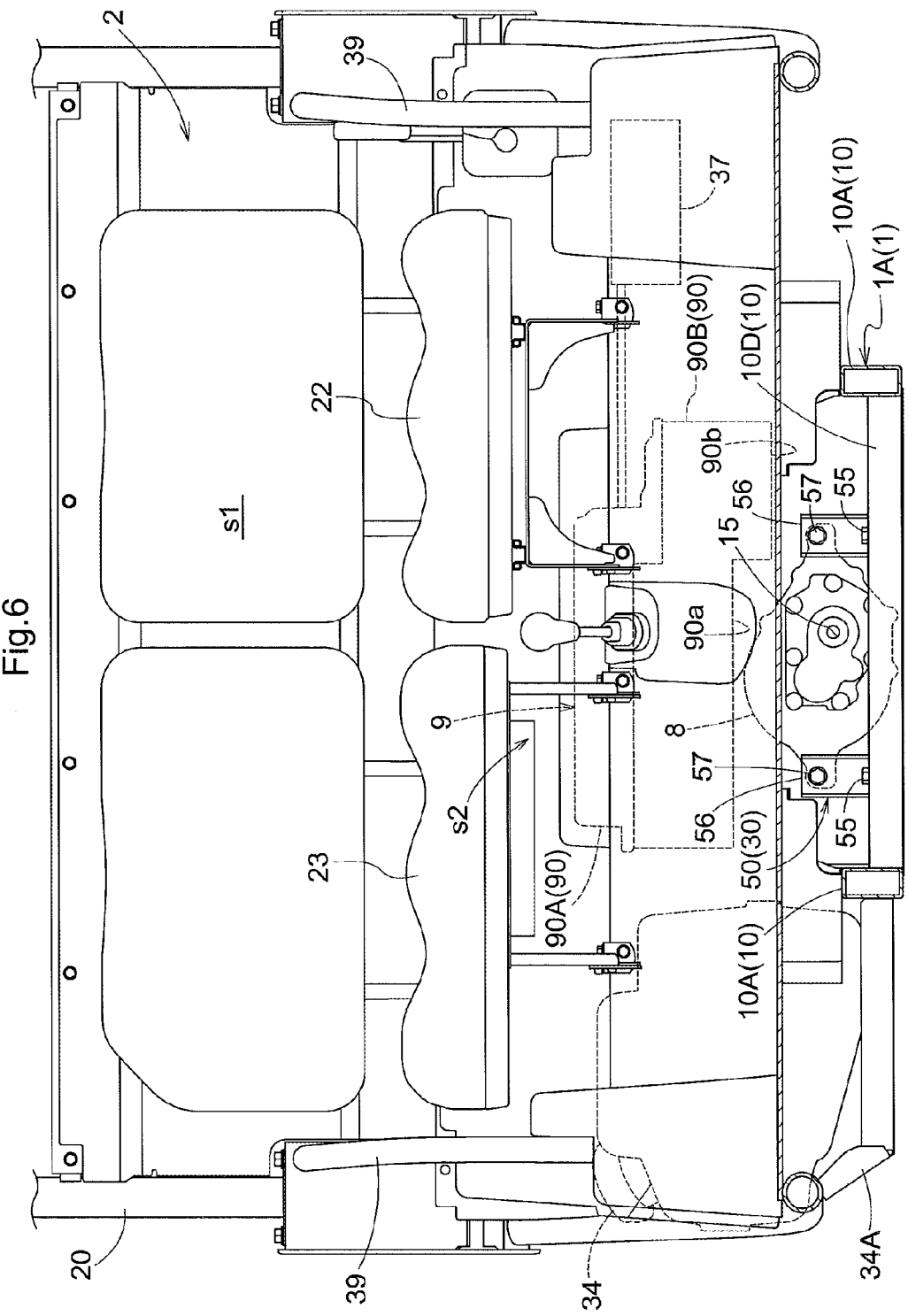
FIG. 6 is a front view showing the driver seat and the below-seat space as seen from the front of the driver seat.

Under the occupant space s1 surrounded by the ROPS frame 20 is a below-seat space s2 defined underneath the driver seat 22 and the passenger seat 23 (i.e., the lower space). As shown in FIGS. 4-6, the space s2 is utilized to accommodate a fuel tank 34 for supplying fuel to the engine 6 and the battery 9 for supplying electric power to the electric motor 8.

Additionally, the below-seat space s2 is used to contain the electric motor 8, which is mounted on the motive power portion support frame 30, which also supports the engine 6. The specific structure in which the electric motor 8 is mounted on the motive power portion support frame 30 will be described below.

Vehicle Frame

Figure 8:
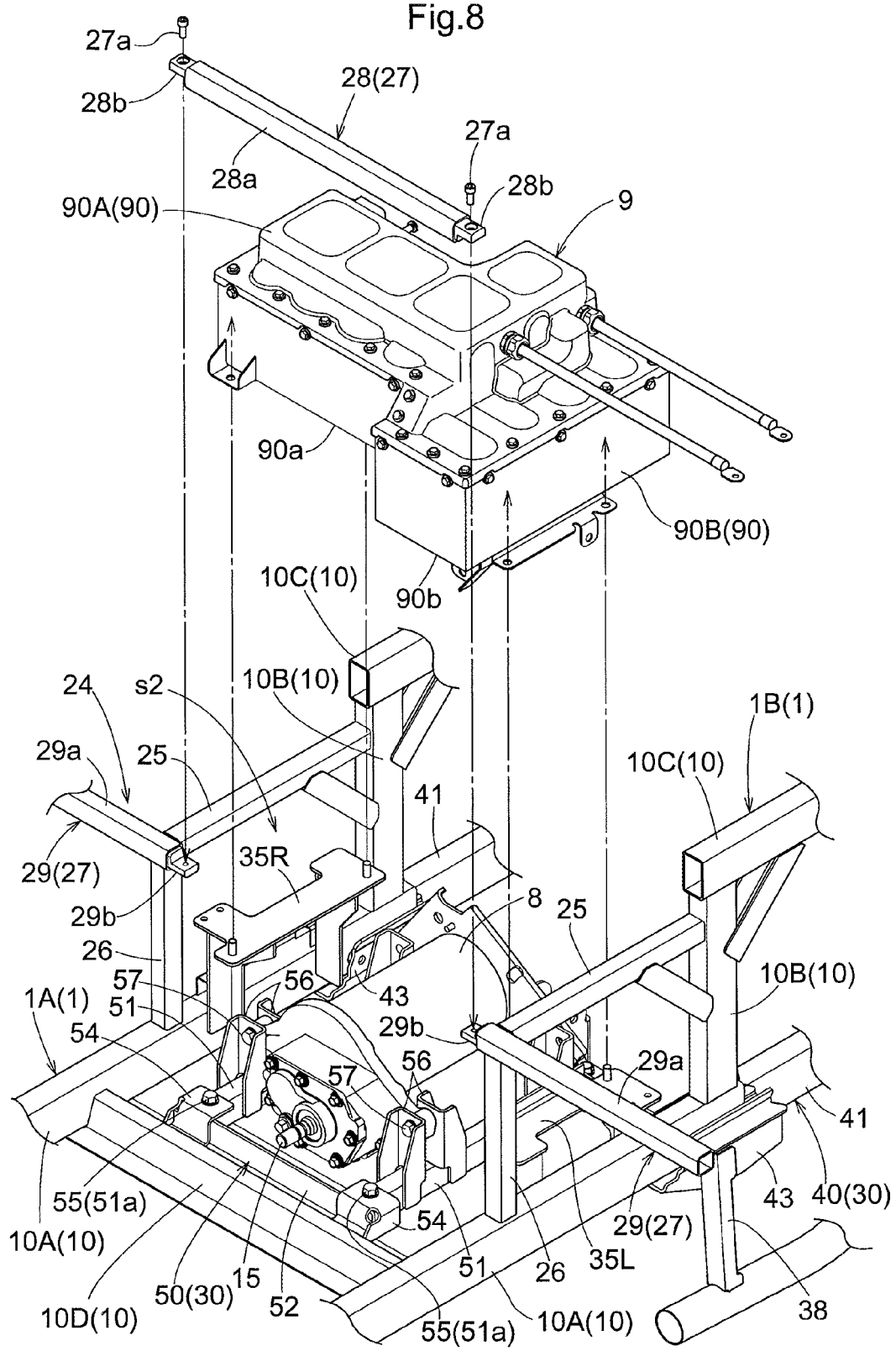
FIG. 8 is an exploded perspective view of the seat support frame and the below-seat space.

As shown in FIGS. 1, 4, and 8, the vehicle frame 1 includes a front portion vehicle frame 1A provided to support the floor of the driving portion 2 and a rear portion vehicle frame 1B positioned at a higher level than the floor of the driving portion 2. The rear portion vehicle frame 1B is positioned behind, and formed integrally with, the front portion vehicle frame 1A.

More specifically, the vehicle frame 1 includes a left and right pair of main frames 10 elongated in the front and rear directions (or longitudinally). Each main frame 10 includes a front frame 10A, a rear frame 10C, and a riser leg portion 10B positioned intermediate between the front frame 10A and the rear frame 10C so as to form a step-wise structure with a lower front portion and a higher rear portion. The right and left main frames 10 are integrated by being connected to horizontal staves 10D at a plurality of locations in the longitudinal direction.

Each main frame 10 extends along the entire front-rear lengths of the front portion vehicle frame 1A and the rear portion vehicle frame 1B. Of the elements constituting the main frames 10, the front frames 10A provide the skeleton framework of the front portion vehicle frame 1A and the rear frames 10C provide the skeleton framework of the rear portion vehicle frame 1B. Each riser leg portion 10B, located intermediate between the front portion vehicle frame 1A and the rear portion vehicle frame 1B, integrally connects the front frame 10A and the rear frame 10C.

As shown in FIGS. 1 and 2, the front portion vehicle frame 1A supports the right and left front wheels 4F via right and left front suspensions (not shown). The motive power portion support frame 30 is secured to the underside of the rear portion vehicle frame 1B and supports the right and left rear wheels 4R via right and left rear suspensions 4A.

In addition to supporting the rear wheels 4R as described above, the motive power portion support frame 30 forms the motive power portion 3 under the rear portion vehicle frame 1B and constitutes part of the vehicle frame 1. In other words, the motive power portion support frame 30 constitutes part of the vehicle frame 1 while being connected to the main frames 10, and the motive power portion support frame 30 is also formed in a manner that permits it to be removably connected to the main frames 10, i.e., the rear end of the front portion vehicle frame 1A and the rear end of the rear portion vehicle frame 1B.

Drive Section Support Frame

The motive power portion support frame 30 includes an engine side frame portion 40 on which the engine 6 and the transmission case 7 are mounted and a motor side frame portion 50 on which the electric motor 8 is mounted, and the motive power portion support frame 30 has the configuration described below.

Figure 10:
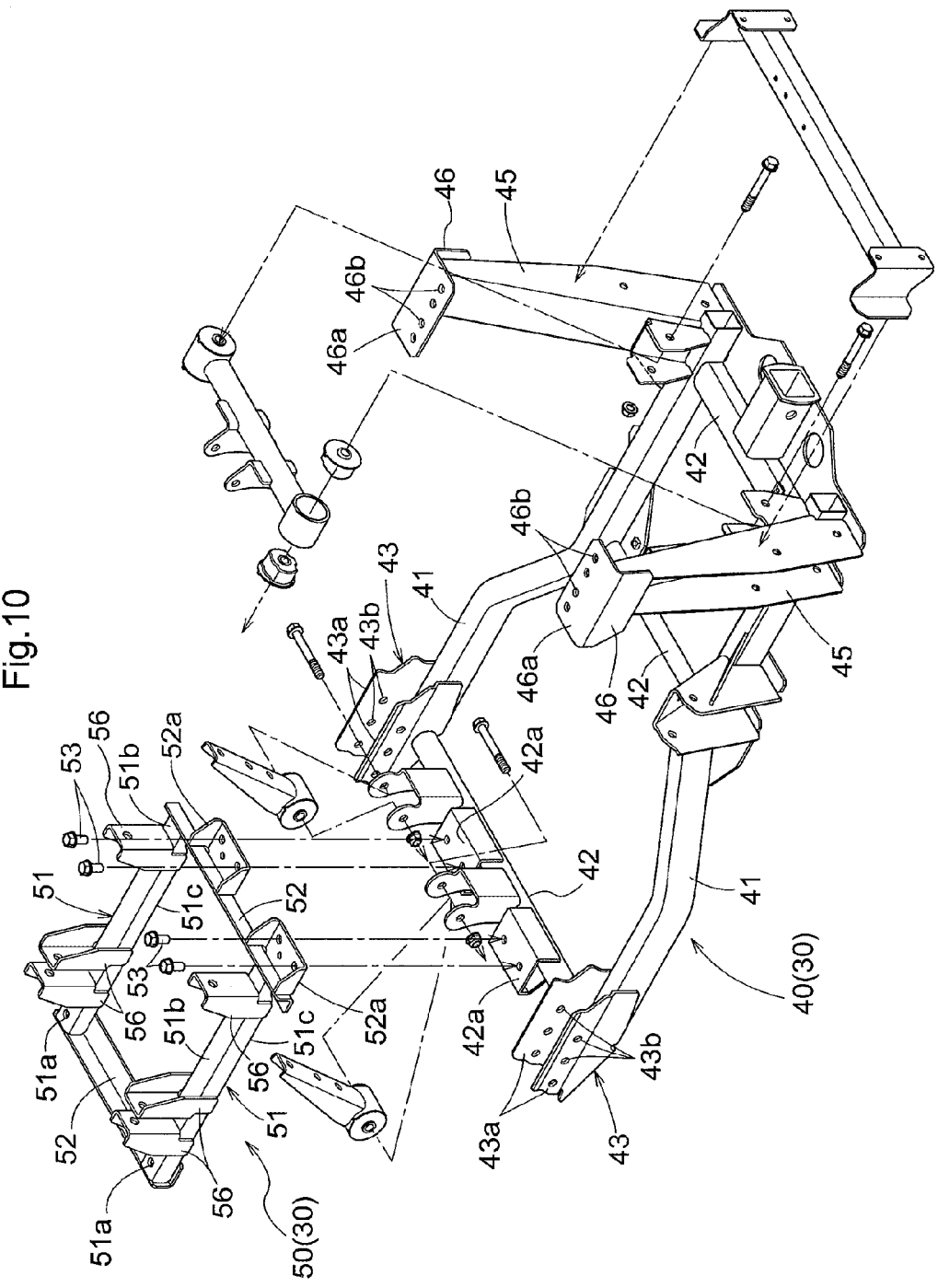
FIG. 10 is an exploded perspective view showing the motive power portion support frame.

As shown in FIGS. 4, 5 and 10, the front end of the engine side frame portion 40 is configured to be connectable to the rear end of the front frames 10A at the rear end of the front portion vehicle frame 1A. The rear end of the engine side frame portion 40 is configured to be connectable to the rear frames 10C at the rear end of the rear portion vehicle frame 1B.

The rear end of the motor side frame portion 50 is connected to the front end of the engine side frame portion 40. Additionally, the front end of the motor side frame portion 50 is detachably connected to the front portion vehicle frame 1A at a position forward of where the rear end of the front portion vehicle frame 1A is connected to the front end of the engine side frame portion 40.

Thus constructed, the engine side frame portion 40 and the motor side frame portion 50 are detachably connected to the main frames 10 while being integrally connected to each other.

The engine side frame portion 40 will now be described in further detail.

As shown in FIGS. 5 and 10, the engine side frame portion 40 includes a left and right pair of longitudinal frames 41 with their front, rear, and intermediate portions integrally connected with horizontally bridging members 42. The right and left longitudinal frames 41 are made of rectangular pipes having a rectangular cross-section. To avoid interference with the rear wheels 4R, these rectangular pipes are bent at an intermediate position in the longitudinal direction so that the rear lateral interval is formed narrower than the front lateral interval. The front lateral interval between the longitudinal frames 41 is substantially the same as the rear lateral interval between the front frames 10A of the main frames 10.

Attached to the front end of the engine side frame portion 40 are U-shaped brackets 43 that connect the frame portion's front end to the rear ends of the front frames 10A. Attached to the rear end of the engine side frame portion 40 are suspending members 45 that connect the frame portion's rear end to the rear ends of the rear frames 10C.

To be able to connect to the right and left rear frames 10C, the lateral interval between the top portions of the suspending members 45 is formed larger than the lateral interval between their bottom portions that are connected to the rear ends of the right and left longitudinal frames 41. Accordingly, the suspending members 45 define a downwardly tapering form as seen in a longitudinal direction.

The front end of the engine side frame portion 40 is connected to the rear ends of the front frames 10A via the connecting U-shaped brackets 43 provided at the front end of the engine side frame portion 40.

The U-shaped brackets 43 are each formed in a U-shape with an open upper side so that the inner bottom surface and the left and right inner surfaces thereof can be brought into intimate contact with and welded to the outer peripheral surfaces of the front ends of the engine side frame portion 40 except for the upper surfaces thereof. Bolt insertion holes 43b are formed in the sidewall portions 43a of the U-shaped brackets 43 that protrude above the upper edges of the engine side frame portion 40.

The U-shaped brackets 43 are mounted from under the front frames 10A so as to bring the left and right inner surfaces of the sidewall portions 43a into contact with the left and right outer surfaces of the rear ends of the front frames 10A. Thereupon, the bolt insertion holes (not shown) formed in the rear ends of the front frames 10A are aligned with the bolt insertion holes 43b, and connecting bolts 44 are then inserted laterally and tightened (see FIGS. 1 and 4) in the holes. This causes the sidewall portions 43a to laterally sandwich and hold the rear ends of the front frames 10A, thus securely connecting the brackets 43 to the front frames 10A.

The following describes the manner in which the rear end of the engine side frame portion 40 is connected to the rear end of the rear portion vehicle frame 1B.

As shown in FIGS. 4, 5 and 10, the lower ends of the suspending members 45 are welded to the rear end of the engine side frame portion 40 so as to allow the upper ends of the suspending members 45 to hang from the rear frames 10C at the rear end of the rear portion vehicle frame 1B.

Connection abutment plates 46 are welded to the upper ends of the suspending members 45. The connection abutment plates 46 each include an upward facing abutment surface 46a with bolt insertion holes 46b formed therethrough. Of the side surfaces of the rear frames 10C, the side surfaces facing inward of the traveling body have welded thereto mounting brackets 47 with downward facing lower surfaces. These mounting brackets 47 also have bolt insertion holes (not shown) formed therethrough.

While the bolt insertion holes 46b are in alignment with the bolt insertion holes (not shown) formed in the mounting brackets 47, connecting bolts 48 are inserted vertically and tightened therein. This detachably and securely connects the upper ends of the suspending members 45 with the rear frames 10C.

The motor side frame portion 50 will now be described in further detail.

As shown in FIGS. 5, 8, and 10, the motor side frame portion 50 has a left and right pair of longitudinal frames 51 comprised of channel members that have a downwardly open cross-section. With the longitudinal frames 51 and a front and rear pair of horizontally bridging members 52 that connect the frames 51 at the front and rear ends thereof, the motor side frame portion 50 forms a rectangular frame as seen from the above.

The lateral interval between the longitudinal frames 51 of the motor side frame portion 50 is formed narrower than the lateral interval of the front frames 10A of the main frame 10 so as to be disposed between the left and right front frames 10A.

The rear horizontally bridging member 52 of the motor side frame portion 50 has mounted thereon a left and right pair of connecting brackets 52a that are set on a left and right pair of attachment seats 42a provided on the front horizontally bridging member 42 of the engine side frame portion 40. The rear end of the motor side frame portion 50 is configured to be integrally connected to the engine side frame portion 40 by inserting and tightening connecting bolts 53 through the connecting brackets 52a and the attachment seats 42a.

The front end of the motor side frame portion 50 is configured to be detachably connected to the connecting members 54 mounted on a horizontal stave 10D that horizontally bridges the front frames 10A of the main frames 10.

More particularly, connecting holes 51a are formed in the upper surfaces of the front ends of the longitudinal frames 51 of the motor side frame portion 50, while lock nuts (not shown) are fixed to the positions of the rear surfaces of the longitudinal frames 51 where the connecting holes 51a are formed. Accordingly, the connecting bolts 55 can be tightened for connection when the connecting holes 51a of the longitudinal frames 51 are aligned with the connecting holes (not shown) formed in the connecting members 54. The connecting bolts 55 can also be loosened for disengagement.

The aforementioned connecting members 54 are connected to the front ends of the longitudinal frames 51 in the vehicle frame 1 at positions longitudinally forward of where the rear ends of the front frames 10A are connected to the front end of the engine side frame portion 40.

Figure 9:
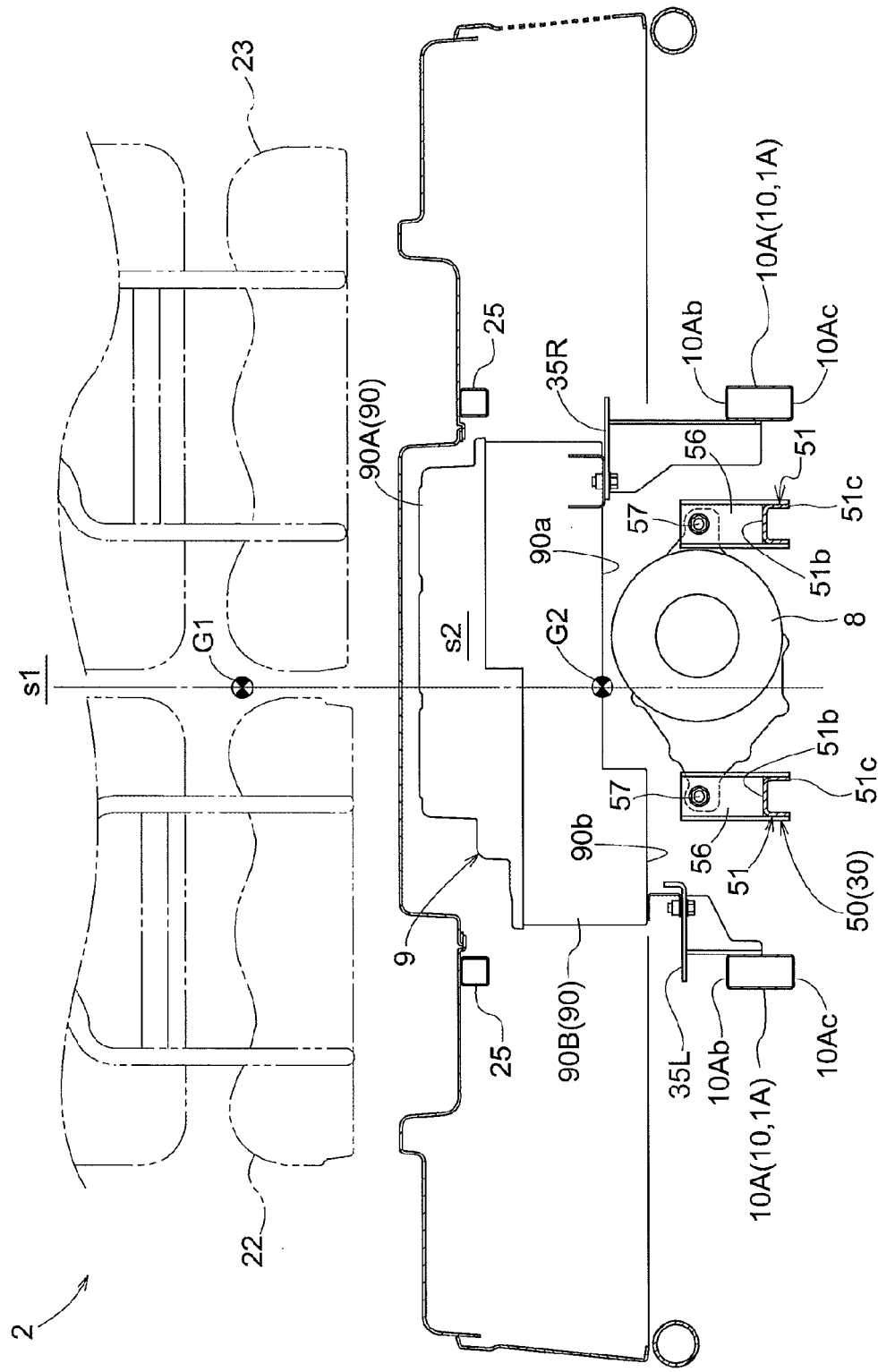
FIG. 9 is a cross section taken along lines IX-IX of FIG. 4.

As shown in FIG. 9, the upper edges 51b of the longitudinal frames 51 of the motor side frame portion 50 are located slightly lower than the upper edges 10Ab of the front frames 10A, and the lower edges 51c of the longitudinal frames 51 are set at the approximately same level as the lower edges 10Ac of the front frames 10A. In this way, as the longitudinal frames 51 are disposed in a low position vertically within the height of the front frames 10A, the electric motor 8 can easily be disposed in a low position on the vehicle frame 1.

A plurality of mounts 56 (i.e., motor supports) are erected on the upper sides of the longitudinal frames 51 of the motor side frame portion 50 to connect and secure the electric motor 8. Connecting bolts 57 are inserted and tightened through the mounting portions provided on the periphery of the electric motor 8. This secures the electric motor 8 to the front and rear mounts 56.

With the electric motor 8 mounted on the motor side frame portion 50, the lower edge of the electric motor 8 is located lower than the upper edges 10Ab of the front frames 10A of the main frame 10 and higher than the lower edges of the front frames 10A (see FIG. 6).

Seat Support Frame

The seat support frame 24 will now be described in further detail.

Figure 7:
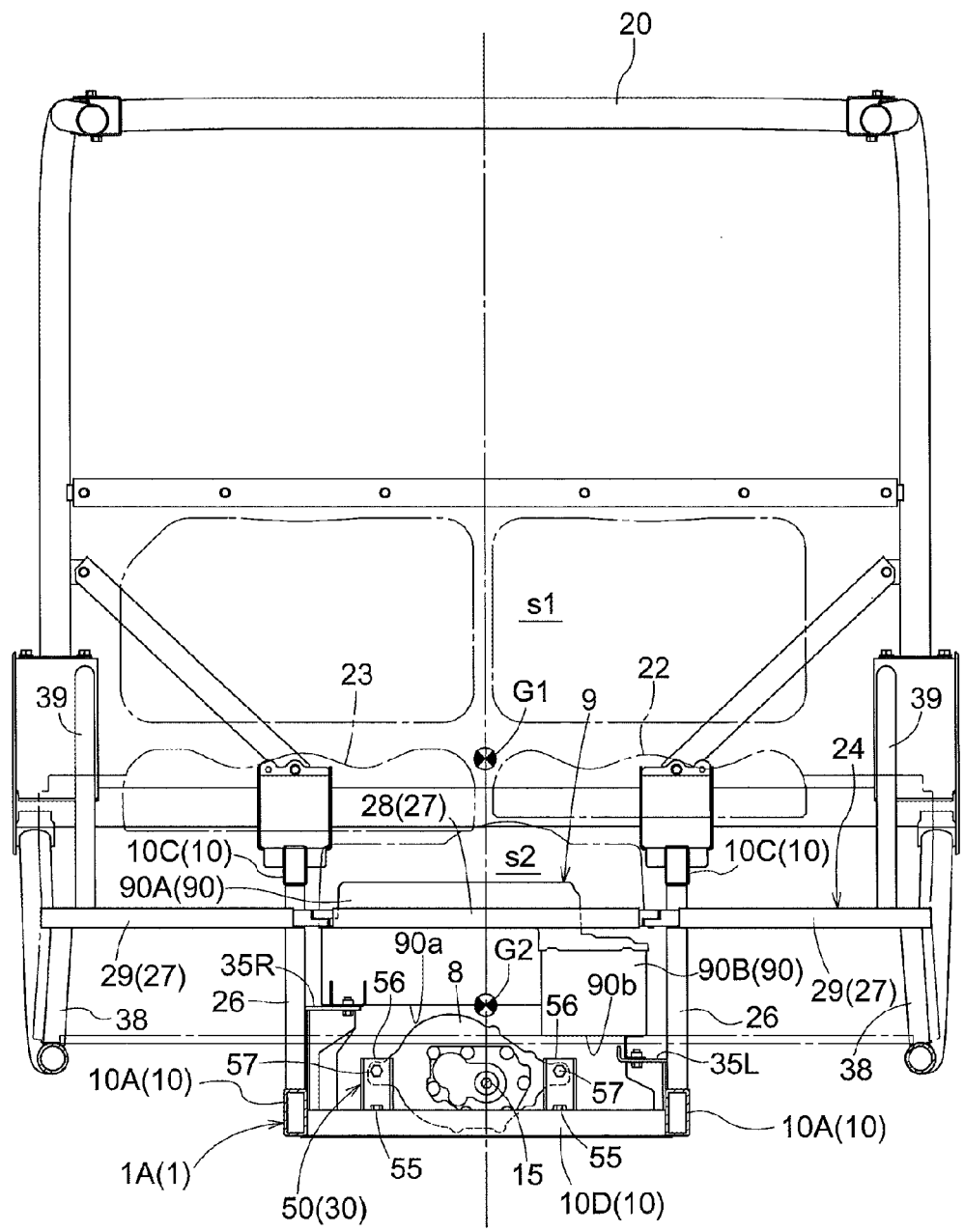
FIG. 7 is a front view showing the below-seat space as seen from the front of the driver seat.

As shown in FIGS. 4 and 7, located below the occupant space s1 surrounded by the ROPS frame 20, the seat support frame 24 serves to support the driver seat 22 and the passenger seat 23 and also define the below-seat space s2 below the driver seat 22 and the passenger seat 23.

As shown in FIG. 6, the below-seat space s2 is used to accommodate the fuel tank 34 for supplying fuel to the engine 6, the battery 9 for supplying electric power to the electric motor 8, and various electrical control devices 37 while also providing space for accommodating the electric motor 8 itself.

As shown in FIG. 8, the seat support frame 24 includes: a left and right pair of forward frames 25 extending forward from the upper portions of the right and left riser leg portions 10B of the main frame 10; a left and right pair of upright frames 26 erected on the upper surfaces of the right and left front frames 10A; and a laterally-oriented frame 27 laterally connecting the intersections of the forward frames 25 and the upright frames 26.

A seat mount (not shown) is set on the upper side of the seat support frame 24 to secure the driver seat 22 and the passenger seat 23 thereto.

As shown in FIG. 6, in the below-seat space s2 formed under the seat support frame 24, a tank support 34A is extended rightward from the right front frame 10A (leftward as seen in FIG. 6) to mount the fuel tank 34 on the top surface of the tank support 34A.

The various electric control devices 37 are disposed laterally outward to the left of the left front frame 10A (rightward as seen in FIG. 6) via fitting members connected to the laterally-oriented frame 27 of the seat support frame 24 as required.

The battery 9 for supplying electric power to the electric motor 8 is provided between the right and left front frames 10A in the below-seat space s2. The battery 9 and its mounting structure will be described in further detail below.

In the seat support frame 24, the laterally extending laterally-oriented frame 27 is configured to be separable between the right and left front frames 10A at two locations slightly off the intersections of the right and left forward frames 25 and the upright frames 26 toward the center of the traveling body.

As this configuration allows for the removal of a portion of the laterally-oriented frame 27 that is opposed to the battery 9, it facilitates hoisting up and down the battery 9 even if a portion of the battery 9 provided in the below-seat space s2 is designed to be located directly under the laterally-oriented frame 27.

More specifically, as shown in FIGS. 7 and 8, the rectangular-piping laterally-oriented frame 27 is composed of detachable frame portion 28 and undetachable fixed frame portions 29.

Each of the fixed frame portions 29 is secured to the vehicle frame 1 by connecting the fixed frame portion 29 to the intersection of the forward frame 25 and the upright frame 26 near the end of the portion proximal to the center of the traveling body and also connecting the fixed frame portion 29 to an outer leg frame 38 and a handrail frame 39 both provided laterally outward of the front frame 10A near the end of the portion distal to the center of the traveling body.

Although both ends of the detachable frame portion 28 are configured to be connectable to the right and left fixed frame portions 29, the detachable frame portion 28 is not connected to any other part.

The following described how the detachable frame portion 28 is connected to the fixed frame portions 29:

Each of the detachable frame portion 28 and the fixed frame portions 29 is comprised of a rectangular pipe-shaped frame tube 28a or 29a and prism-shaped connectors 28b or 29b fitted and integrated in the ends of the frame portion. Of the connectors 28b and 29b, the end of each connector 29b of the fixed frame portions 29 has its upper half cut off where it opposes the detachable frame portion 28. The end of each connector 28b of the detachable frame portion 28 has its lower half cut off where it opposes the fixed frame portion 29.

A worker sets the connectors 28b of the detachable frame portion 28, whose lower halves are cut off, on the upper sides of the connectors 29b of the fixed frame portions 29, whose upper halves are cut off, and connects the connectors 28b and 29b together with vertical connecting bolts 27a that vertically penetrate the connectors 28b and 29b. This connects the detachable frame portion 28 and the fixed frame portions 29.

Drive Section

The motive power portion 3, in which two systems of travel output units are provided, will now be described.

The part of the vehicle under the foregoing seat support frame 24 and the part of the vehicle over the foregoing motive power portion support frame 30 constitute the motive power portion 3.

Of the two systems of travel output units, one is the engine 6, i.e., an internal combustion, and the other is the electric motor 8 for driving the vehicle to travel.

This utility vehicle is configured to use the power of the engine 6 to drive the rear wheels 4R and use the driving power of the electric motor 8 to drive the front wheels 4F.

The vehicle is in four-wheel drive mode when the engine 6 is driving the rear wheels 4R and the electric motor 8 is driving the front wheels 4F at the same time. The vehicle is in two-rear wheel drive mode when only the engine 6 is driving the rear wheels 4R and it is in two-front wheel drive mode when only the electric motor 8 is driving the front wheels 4F.

Although specific description is omitted, the operation of the vehicle can be switched as desired among the four-wheel drive mode, the two-rear wheel drive mode, and the two-front wheel drive mode by switching an operating device (not shown) provided in the driving portion 2.

As shown in FIGS. 2-4, in the part of the motive power portion 3 above the motive power portion support frame 30, the transverse engine 6 with its output shaft (not shown) extending in the lateral direction is disposed in a backwardly tilted position with the cylinder head 6A located behind the aforementioned output shaft in the vehicle body. This backwardly tilted position of the engine 6 makes it possible to reduce the overall height of the engine 6 while keeping the output shaft horizontal and thus reduce the overall height of the motive power portion 3.

A transmission case 7, which contains a transmission, is disposed rear of the engine 6. A belt-type infinite variable speed drive 31 is disposed laterally to the left of the engine 6 and the transmission case 7, and an exhaust disposal system 33, such as a muffler, is disposed halfway in the exhaust pipe 32 extending rearward along the upper portion of the belt-type infinite variable speed drive 31.

As shown in FIGS. 6-8, in the part of the motive power portion 3 under the seat support frame 24, the fuel tank 34 for supplying fuel to the engine 6 is provided on the right end of the below-seat space s2 as described above, and the various electrical control devices 37 for providing control signals to the engine 6 and the electric motor 8 are provided on the left end of the below-seat space s2.

Moreover, disposed on the left end of the below-seat space s2 is a control battery 36 (see FIG. 1) for providing control signals to the various electrical control devices 37 and supplying electrical power to control the operation of the engine 6. Only part of the front portion of the control battery 36 is located under the seat support frame 24 with the rear portion thereof protruding rearward below the seat support frame 24.

Of the elements disposed under the seat support frame 24, the electric motor 8 for driving the front wheels 4F and the battery 9 for supplying power to the electric motor 8 are placed between the right and left main frames 10 located at the center of the vehicle in the lateral direction.

The battery 9 is a lithium ion battery configured as a plug-in type for receiving electrical power from the outside the vehicle.

In the below-seat space s2, the battery 9 is disposed in a slightly higher position by a right mount 35R and a left mount 35L with the electric motor 8 disposed directly under the battery 9. The battery 9 is positioned forward of the engine 6 at substantially the same range of height.

The output shaft (not shown) of the electric motor 8 extends toward the front of the traveling body. The front wheel drive shaft 15 is connected to the output shaft to transmit the driving force of the electric motor 8 to the front wheels 4F via the front wheel differential case 16 and the front axles 17.

Battery Unit

The battery 9, disposed under the seat support frame 24, is configured as described below.

Figure 11:
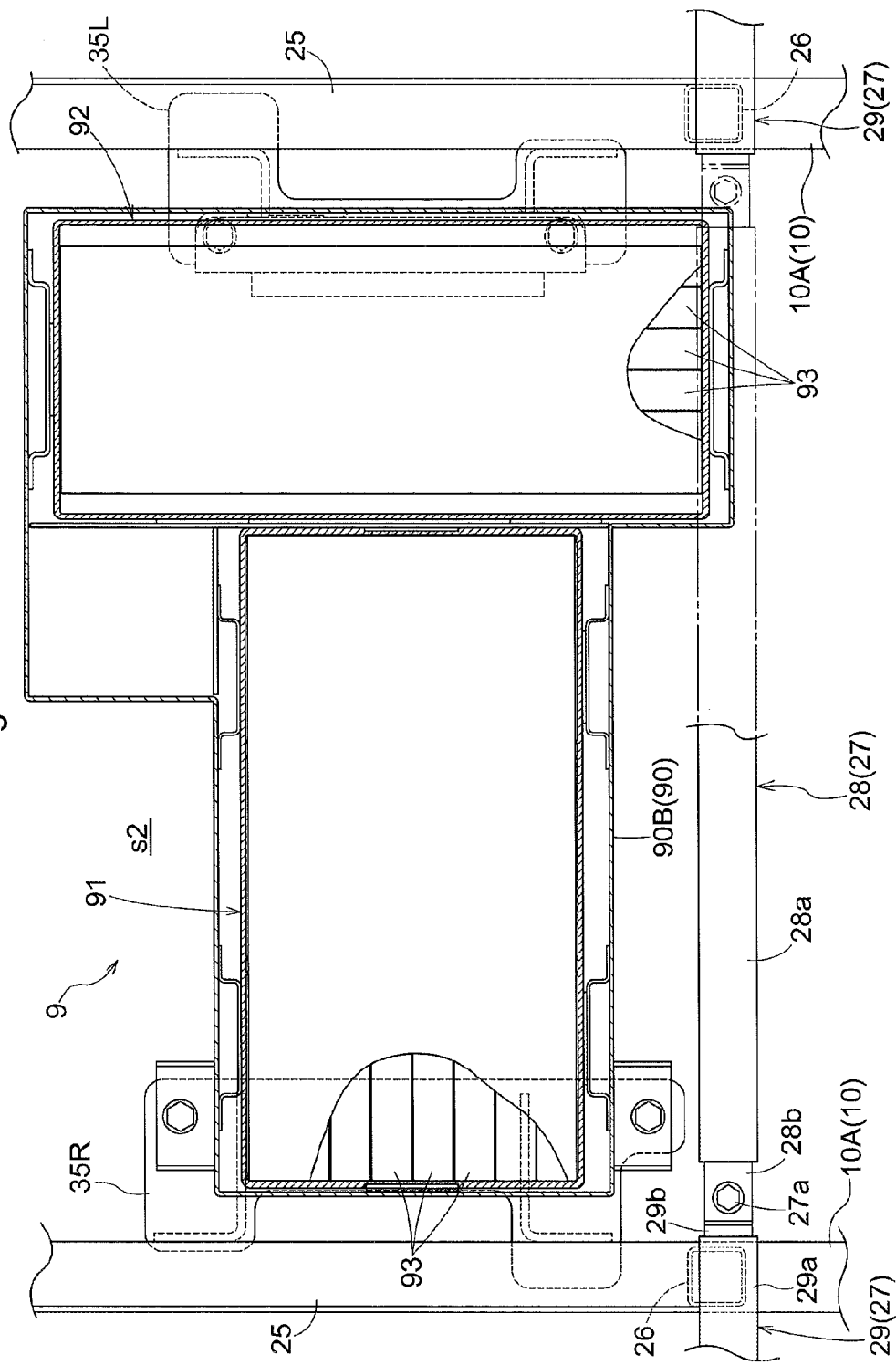
FIG. 11 is a horizontal cross section showing where the battery is mounted.
Figure 12:
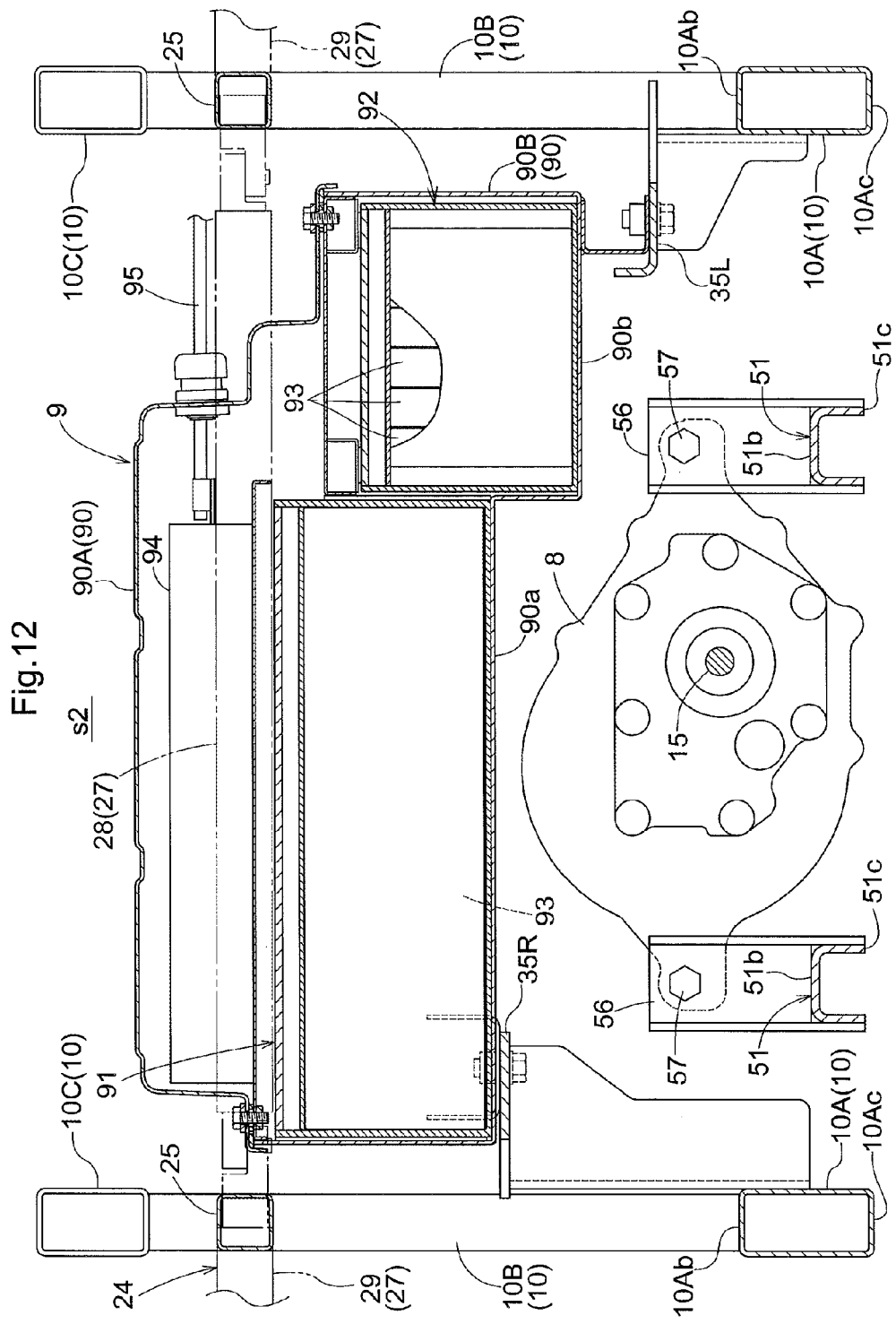
FIG. 12 is a vertical cross section showing where the battery is mounted.
Figure 13:
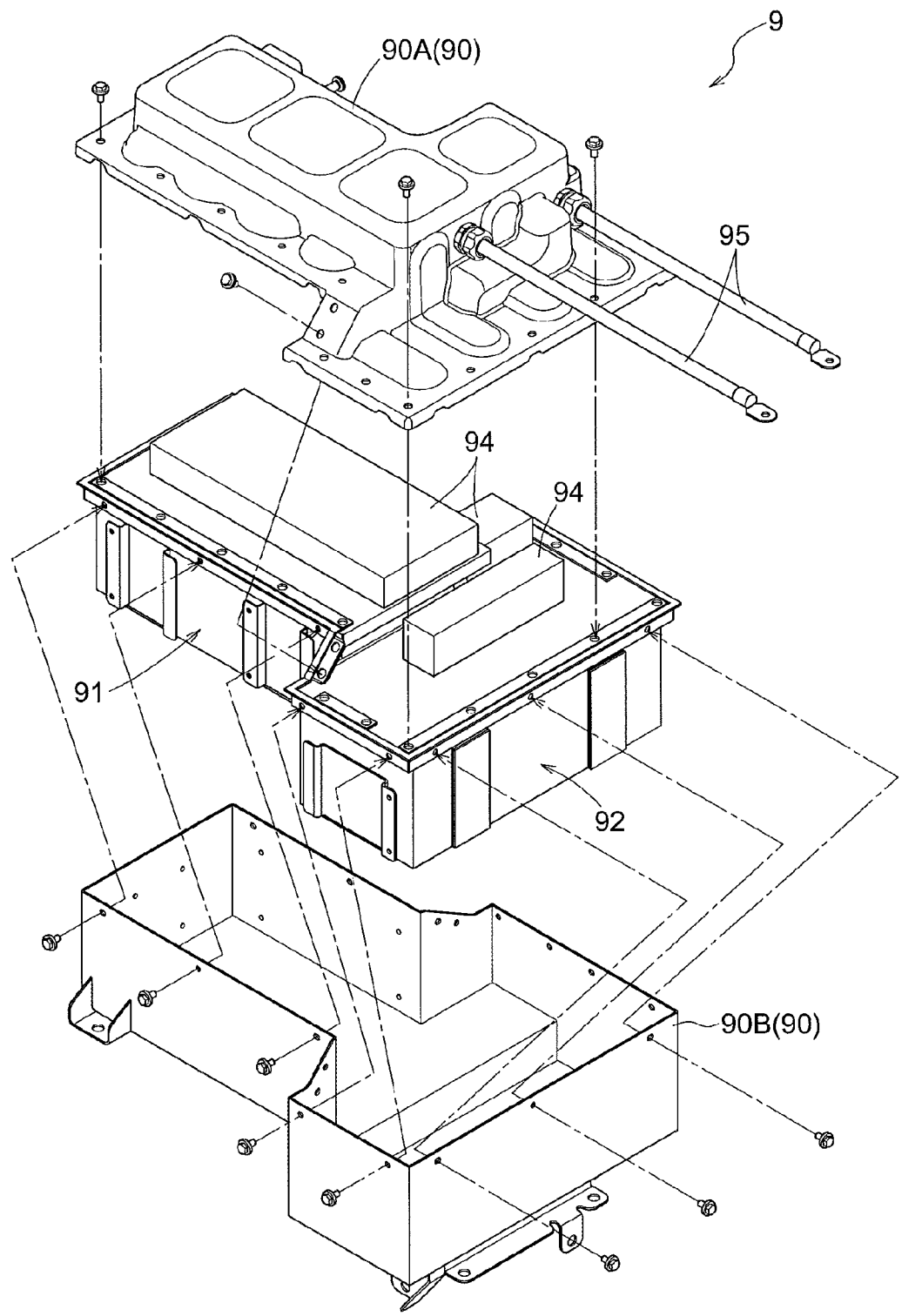
FIG. 13 is an exploded perspective view showing the battery.

As shown in FIGS. 11-13, the battery 9 is comprised of a battery pack that includes two battery modules 91 and 92 each comprised of an aggregate of multiple cells 93 and a single battery case 90 containing the battery modules 91 and 92. The battery pack additionally contains electrical equipment 94, such as a current sensor and a temperature sensor, in the battery case 90.

Each of the battery modules 91 and 92 has an external appearance of a rectangular box whose longitudinal length is different from its lateral length in a planar view, and the battery case 90 accommodates both battery modules 91 and 92 in a continuous space.

As described above, each of the battery modules 91 and 92 is formed in a shape of a rectangular box, and the battery modules 91 and 92 are arranged in the battery case 90 in such a manner as to cause their longitudinal axes to orthogonally intersect each other.

That is, the battery modules 91 and 92 are arranged adjacent to each other in a T-shape as seen from the above, with a short side of the battery module 91 opposing a long side of the other battery module 92.

In particular, the first battery module 91, located on the right side (the lower side in FIG. 11), is disposed laterally with its long sides extending along the lateral direction of the traveling body. The second battery module 92, located on the left side (the upper side in FIG. 11), is disposed longitudinally with its long sides extending along the longitudinal direction of the traveling body.

Additionally, also with respect to the vertical direction, the mutually adjacent battery modules 91 and 92 are not located on the same plane. Rather, the modules are arranged in a stepwise manner with the battery module 91 higher than the other battery module 92.

In this embodiment, the first battery module 91, located on the right side (the left side in FIG. 12), is positioned higher than the second battery module 92, located on the left side (the right side in FIG. 12).

Most of the electrical equipment 94 is mounted on the higher first battery module 91 rather than the second battery module 92, and conductive harnesses 95 extend over the lower second battery module 92 to the various electrical control devices 37 located on the laterally left side thereof. The first battery module 91 and the second battery module 92 are connected in series and the aforementioned conductive harnesses 95 are coupled to common input/output ports (not shown).

The battery case 90 includes a lower case 90B having an open upper side to receive the first battery module 91 and the second battery module 92 and an upper case 90A having an open lower side with an opening having an identical shape to the upper opening of the lower case 90B. The upper case 90A is configured to cover the electrical equipment 94 mounted on the upper side of the first battery module 91 and the second battery module 92.

It should be noted that the battery case 90 is formed to conform to the contours of the aggregate consisting of the first battery module 91 and the second battery module 92 and the electrical equipment 94 located thereabove. In other words, the battery case 90 has a substantially T-shape as seen from the above and a stepwise shape having different levels as seen in the longitudinal direction.

In the battery case 90, the bottom surface 90a under the first battery module 91, located on the right side (the left side in FIG. 12), is set higher than the bottom surface 90b under the second battery module 92, located on the left side (the right side in FIG. 12).

As shown in FIGS. 7-9, the higher bottom surface 90a of the battery case 90, which is on the right side, is secured to the taller right mount 35R erected on the right front frame 10A whereas the lower left bottom surface 90b is secured to the shorter left mount 35L erected on the left front frame 10A.

Of the two bottom surfaces 90a and 90b with different elevations, the lateral length of the higher right bottom surface 90a is longer than that of the left bottom surface 90b. The electric motor 8, mounted on the motor side frame portion 50 of the motive power portion support frame 30, is disposed in the space underneath the higher right bottom surface 90a such that the electric motor 8 longitudinally and laterally overlaps the bottom surface 90a in a planar view.

Due to the foregoing arrangement, the battery 9 and the electric motor 8 are collectively mounted as an aggregate close to the center of the traveling body in the longitudinal and lateral directions.

In other words, the battery 9 and the electric motor 8 are disposed between the left and right front frames 10A in the lateral direction and between the front axles 17 and the rear axles 14 in the longitudinal direction so as to be positioned in the below-seat space s2 relatively close to the center of the vehicle.

Furthermore, the battery 9 and the electric motor 8 are provided in a vertically low position on the vehicle frame 1.

More specifically, the battery 9 is mounted on the front frames 10A, which are located relatively low in the vehicle frame 1, via the right mount 35R and the left mount 35L. The motor side frame portion 50 comprises the longitudinal frames 51, which in turn include the upper edges 51b at a lower level than the upper edges 10Ab of the front frames 10A with the electric motor 8 mounted on the longitudinal frames 51. In this way, as the motor side frame portion 50 is disposed as low as possible in the traveling body, the electric motor 8 is likewise mounted as low as possible in the traveling body.

In addition, as the electric motor 8 is disposed under the higher bottom surface 90a of the battery 9 with a step on the bottom surface, the battery 9 and the electric motor 8 overlap each other in the longitudinal direction and the lateral direction in a planar view. This advantageously brings the center of gravity G2 of the aggregate consisting of the battery 9 and the electric motor 8 as low as possible in the traveling body.

As a result, as shown in FIG. 7, in the utility vehicle with sturdy ROPS frame 20, which tends to elevate the center of gravity G1 of the entire traveling body, the center of gravity G2 of the aggregate of the battery 9 and the electric motor 8 is located lower than the center of gravity G1 of the entire traveling body. In other words, the foregoing arrangement of the battery 9 and the electric motor 8 serves to lower the center of gravity G1 of the entire traveling body.

As used herein, the center of gravity G1 of the entire traveling body refers to the center of gravity G1 of the entire traveling body with the battery 9 and the electric motor 8 mounted on the vehicle frame 1.

Alternative Embodiment 1

In the foregoing embodiment, the two battery modules 91 and 92 are accommodated in the battery case 90. It should be noted that the present invention is not so limited; three or more battery modules may also be used.

In that case, the remaining structures of the vehicle may be identical to those in the foregoing embodiment.

Alternative Embodiment 2

Although the foregoing embodiment employs a plug-in type battery as the battery 9, the invention is not limited to this structure.

For example, a generator driven by the engine 6 or by a regenerative apparatus may be used to charge the battery 9.

In that case, the remaining structures of the vehicle may be identical to those in the foregoing embodiment.

Alternative Embodiment 3

According to the foregoing embodiment, although the battery 9 is secured to the front frames 10A and the electric motor 8 is supported by the motor side frame portion 50, the present invention is not limited to this structure. For example, the motor side frame portion 50 may be omitted so that the electric motor 8 as well as the battery 9 may instead be secured to the front frames 10A in the below-seat space s2.

In that case, the remaining structures of the vehicle may be identical to those in the foregoing embodiment.

Alternative Embodiment 4

According to the foregoing embodiment, although the electric motor 8 is disposed under the battery 9, the invention is not limited to this structure. For example, the electric motor 8 may also be set side by side with the battery 9.

In that case, the remaining structures of the vehicle may be identical to those in the foregoing embodiment.

Alternative Embodiment 5

According to the foregoing embodiment, although the driving portion 2 includes a lateral row of seats consisting of the driver seat 22 and the passenger seat 23 arranged side by side, the invention is not limited to this structure.

Figure 14:
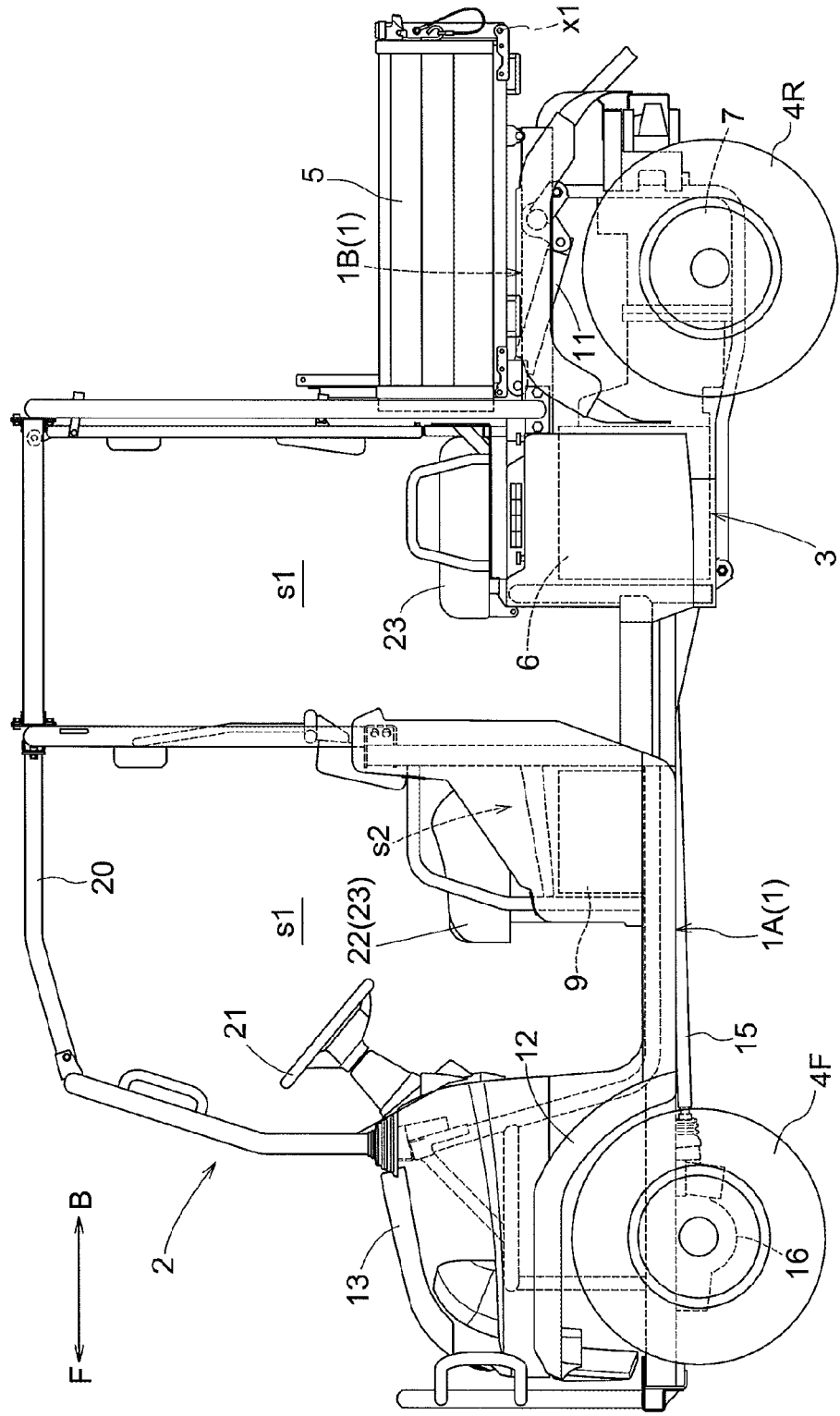
FIG. 14 is a side view showing a utility vehicle according to an alternative embodiment.

For example, as shown in FIG. 14, the driving portion 2 may include two front and rear rows of seats with the driver seat 22 and the passenger seat 23 arranged in the front row and a laterally long passenger seat 23 in the rear row. In this case, the battery 9 is disposed preferably in the below-seat space s2 on the front row where the battery 9 is close to the center of the traveling body in the longitudinal direction.

Moreover, the present invention may include three or more rows arranged in the longitudinal direction, in which case the battery 9 is disposed preferably in the below-seat space s2 close to the center of the traveling body in the longitudinal direction.

In that case, the remaining structures of the vehicle may be identical to those in the foregoing embodiment.

What is claimed is:

1. A work vehicle comprising:
   a vehicle frame;
   a driving portion in which a driver seat is provided;
   an electric motor for driving the vehicle to travel; and
   a battery for supplying electric power to the electric motor, the battery including a plurality of battery modules accommodated in a single battery pack;
   wherein each of the battery modules is formed as a rectangular box whose longitudinal length is different from its lateral length in a planar view, and the battery modules are arranged adjacent to each other with a short side of one of the battery modules opposing a long side of another of the battery modules,
   wherein the battery pack is formed to conform to a contour of an aggregate of the battery modules that are accommodated, and
   wherein in the battery pack, one of the battery modules and the other of the battery modules are arranged in a stepwise manner with one of the battery modules higher than the other.

2. The work vehicle according to claim 1, wherein
   in the battery pack, the one battery module, which is a laterally long battery module whose long sides extend in a lateral direction, and the other battery module, which is a longitudinally long battery module whose long sides extend in a longitudinal direction, are accommodated such that a short side of the laterally long battery module opposes a long side of the longitudinally long battery module, and
   the battery pack is disposed between a left and right pair of main frames that constitutes the vehicle frame.

3. The work vehicle according to claim 1, wherein the driver seat is provided in an intermediate position in the traveling body in the longitudinal direction, and the battery pack is disposed in a space under the driver seat.

4. The work vehicle according to claim 1, wherein the electric motor for driving the vehicle to travel is disposed below a portion of the battery pack where the higher one of the battery modules is disposed.

* * * * *